United States Patent [19]

Sumita et al.

[11] 3,890,285

[45] June 17, 1975

[54] PRINTING INK COMPOSITIONS

[75] Inventors: Masujiro Sumita; Masatoshi Mori, both of Tokyo, Japan

[73] Assignees: Toyo Ink Manufacturing Co., Ltd.; Nippon Oil Co., Ltd., both of Tokyo, Japan

[22] Filed: Oct. 19, 1973

[21] Appl. No.: 408,197

[30] Foreign Application Priority Data
Oct. 20, 1972 Japan.............................. 47-104416

[52] U.S. Cl... 260/78.5 BB; 106/287 R; 260/28.5 R
[51] Int. Cl. ............................................ C08f 15/02
[58] Field of Search ................ 260/78.5 BB, 28.5 R; 106/287 R

[56] References Cited
UNITED STATES PATENTS
3,306,868    3/1974    Adrian.......................... 260/78.5 BB FOREIGN PATENTS OR APPLICATIONS
1,000,670    8/1965    United Kingdom

*Primary Examiner*—Melvyn I. Marquis
*Attorney, Agent, or Firm*—Frank J. Jordan

[57] ABSTRACT

An alcohol-soluble and/or water-soluble, printing ink composition comprising, as a vehicle, a resinous varnish composed mainly of a resin having an acid number of at least 180 and prepared by reacting dicyclopentadiene or methyldicyclopentadiene with an unsaturated dibasic acid anhydride.

2 Claims, No Drawings

PRINTING INK COMPOSITIONS

This invention relates to an ink composition comprising a resin as the main component and an alcohol and/or water as the solvent. More particularly it relates to an alcohol-soluble and/or water-soluble ink composition comprising as the main component a resin prepared by reacting dicyclopentadiene or methyldicyclopentadiene with an unsaturated dibasic acid anhydride, and as the main solvent an alcohol and/or water.

Various inks of the type wherein a water- and/or alcohol-soluble resin is used, have heretofore been reported to be recommendable ones for the reason that, for example, they are advantageous from the viewpoint of prevention of environmental pollution; they set in a shorter time and may, before setting, be washed away with water where necessary. Examples of these reported inks are those wherein is used; a rosin modified with maleic acid to increase its polarity, a rosin modified with fumaric acid to the same end as above, a natural high molecular material such as shellac, an aqueous alkyd or acryl resin containing hydroxyl and carboxylic groups in excessive amounts, and millet jelly. Particularly, glycol-soluble inks wherein the fumaric acid- or maleic acid-modified rosin is used, are widely used as corrugated cardboard printing inks, flexographic printing inks, aqueous gravure inks and the like. Aqueous and alcohol-soluble inks wherein these modified resins are used have been desired even more for development or commercial availability from the view-point of prevention of air pollution.

However, rosin as material for fumaric acid- and maleic acid-modified rosin has recently been in short supply due to the heavy demand therefor. Thus, the increase in price of rosin has been rapid. In addition, since rosin is a natural compound composed mainly of abietic acid and varies in composition and properties depending upon the area or district in which it is produced, it is difficult for its users to obtain it at a constant quality at any desired time such as in the case of the corresponding synthetic compounds. Such being the case, manufacturers of printing inks have searched with great interest for a resin substitute for rosin. The present inventors have succeeded in the manufacture of alcohol-soluble inks and aqueous (water-soluble) inks using certain petroleum resins which are less expensive and readily available at a reasonable cost whenever needed, as substitutes for the aforesaid maleic acid- or fumaric acid-modified rosin or the like.

It is known that petroleum resins and maleic-modified ones are used in the preparation of the oily printing inks now in general use. For example, U.S. Pat. No. 3,161,620 discloses that maleic anhydride-modified petroleum resins may be used in preparing thermoset-type printing inks and the like, and that their characteristic high softening point and quick solvent release from the solvent in which they are dissolved are effective for the performance of the aforesaid thermoset-type ink or coating material in which they are used. In addition, Japanese Patent Gazette Publication 27492/71 in which the invention entitled "Vehicle for printing inks and paints" was published, illustrates that a petroleum resin and a phenol-formaldehyde resin can be reacted with each other in the presence of some amount of maleic anhydride to obtain a reaction product which can then be dissolved in toluene or the like for use as a varnish for printing inks.

However, these known maleic compound-modified petroleum resins have a low acid number and are difficult to dissolve not only in water but also in glycols, even in the presence of added amine or alkali, thereby making it difficult to use said resins in preparing aqueous inks. On the other hand, there have been available such petroleum resins having a low acid number as are solubilized in large amounts of an alkali or amine for use as a size for paper or the like.

It has been found by the present inventors that synthesized resins having an acid number of as high as at least 180, from which alcohol-soluble varnishes and water-soluble varnishes may be produced, may be obtained by reacting said resins with small amounts of an amine or alkali to form the corresponding, salts from which can then be made aqueous varnishes.

The resins which can be used in the practice of this invention are those obtained by reacting dicyclopentadiene or methyldicyclopentadiene with an unsaturated dibasic acid anhydride, and they are so highly modified with maleic compounds as to have a softening point of preferably 100°–200°C and acid number of at least 180, properties not easily to be anticipated from those of conventional petroleum resins and maleic-modified resins.

To obtain the resins according to this invention, suitable reaction conditions should selectively be used as indicated thereinunder.

| | |
|---|---|
| Reaction temperature: | 170 – 330°C |
| Reaction time: | 20 min. – 10 hr. |
| Molar ratio between unsaturated dibasic acid anhydride and dicyclopentadiene or methyldicyclopentadiene: | 30/70 – 60/40 |

Were the resins to have an acid number of less than 180, their solubility in alcohols or water would be extremely low. Moreover, the present resins should have a softening point of not lower than 100°C to allow them to dry in a shorter time. In view of the these and other factors such as gloss, the resins according to this invention should have a softening point of preferably 100° to 200°C.

Alcohols which may be used in the inks of this invention include glycols such as ethylene, triethylene and polyethylene glycols; polyhydric alcohols such as glycerine; and monohydric alcohols such as butanol, isopropyl alcohol, ethanol and methanol.

When the resins according to this invention are to be used in the preparation of water-soluble inks, they may partly be converted with the use of an amine or alkali to their amine salts or alkali metal salts to fully increase the total solubility thereof in water since the original resins, per se, are not sufficiently soluble in water. As is apparent from above, a mixture of an alcohol and water may of course be effectively used as the solvent and the use of such a mixture as a substitute for water alone permits the amine or alkali to be used in much less amounts to obtain the same solubility as above.

The amines and alkalies which may be employed include monoethanolamine, diethanolamine, triethanolamine, morpholine and ammonia, as well as sodium and potassium hydroxides.

Pigments to be used in preparing the inks of this invention should be alcohol- or alkali-resistant ones which may be selected from the conventional pigments used for the usual oil-based inks and gravure inks.

To enhance the friction resistance of a film formed from a printing ink, the printing ink may contain microcrystalline wax, oxidized polyethylene wax or the like in the form of a dispersion in ethylene glycol or the like (the dispersion being hereinafter referred to as "wax compound") in amounts of not more than 10 percent by weight of the ink as required.

The use of the resins according to this invention in preparing inks can, at a lower cost, provide inks of the same uniform quality found in the known glycol-soluble inks for printing corrugated cardboard, flexographic inks, aqueous gravure printing inks and the like wherein the maleic compound-modified rosin is conventionally used.

This invention will be better understood by the following comparative examples and working examples wherein all the parts are by weight unless otherwise specified. The methods for the synthesis of resins used in the working examples are detailed in the following reference examples.

COMPARATIVE EXAMPLE 1

Fifty parts of a 22 percent fumaric acid-modified rosin were mixed with 30 parts of diethylene glycol and 10 parts of ethylene glycol to form a mixture which was then melted by heating to an extent short of esterification. After being melted, it was cooled to 90°C and mixed with 10 parts of monoethanolamine. The resulting mixture was thoroughly agitated to form a varnish (this being hereinafter referred to as "varnish A") to be used thereafter. A glycol-soluble printing ink A was prepared from the following ingredients including varnish A by the use of a 3-roller mill.

Ink A

| Ingredient | Amount | |
|---|---|---|
| Finess Red 2B (Red pigment produced by Toyo Ink Mfg. Co.) | 16 | tc,25 Parts |
| Wax compound | 4 | " |
| Varnish A | 74 | " |
| Ethylene glycol | 6 | " |
| | 100 | Parts |

COMPARATIVE EXAMPLE 2

Thirty parts of a 22 percent maleic-modified rosin were dissolved in a mixture comprising a mixed solvent of 25 parts of isopropyl alcohol, 10 parts of ehtnaol, 15 parts of methanol and 15 parts of water, as well as 5 parts of ammonia water, thereby obtaining a varnish B.

The following ingredients including the varnish B, were mixed with each other on a ball mill to prepare a gravure ink A.

Ink B

| Ingredient | Amount | |
|---|---|---|
| Finess Red 2B | 8 | Parts |
| Varnish B | 91.5 | " |
| Defoaming agent (supplied under the trademark of "Shin-etsu Silicone KF-96" by Shin-etsu Chemical Co., Ltd.) | 0.5 | " |
| | 100 | Parts |

Inks A and B obtained in Comparative examples 1 and 2, respectively, were used as the control in the following Examples.

REFERENCE EXAMPLE 1

To an autoclave provided with an agitator were added 184.8 parts of a 97 percent pure dicyclopentadiene, 58.8 parts of maleic anhydride and 243 parts of xylenes, and the resulting mixture was reacted at 270°C for an hour. After the reaction had ended the autoclave was cooled and the contents then distilled under reduced pressure so as to remove therefrom the unreacted monomers and solvent, thereby obtaining a resin which had an acid number of 194 and a softening point of 141.5°C.

REFERENCE EXAMPLE 2

One hundred and sixty parts of a 97 percent pure methyldicyclopentadiene, 88 parts of maleic anhydride and 248 parts of xylenes were together reacted in the same manner as in Reference example 1 to obtain a resin having an acid number of 220 and a softening point of 145°C.

REFERENCE EXAMPLE 3

An autoclave provided with an agitator was charged with 210.2 parts of dicyclopentadiene, 39.2 parts of maleic anhydride and 252 parts of xylenes, and the resulting mixture was reacted at 270°C for 3 hours. The autoclave was cooled at the end of the reaction, and the contents thereof were distilled under reduced pressure to distill off the unreacted monomers and solvent thereby resulting in the obtainment of a resin having an acid number of 120 and a softening point of 130°C. The thus-obtained resin, however, did not dissolve in solvents such as methanol, ethanol, isopropyl alcohol and diethylene glycol and, therefore, it could not be used as a vehicle.

EXAMPLE 1

Forty parts of the resin (acid number, 190; softening point, 141.5°C) synthesized in Reference example 1 were mixed with 33 parts of diethylene glycol and 23 parts of ethylene glycol to form a mixture which was dissolved at 170°C, cooled to 70°C, mixed with 4 parts of diethanolamine and then mixed for homogenization, thereby obtaining a varnish C. Using a 3-roller mill, an ink C was prepared from the following ingredients, including the varnish C.

Ink C

| Ingredient | Amount | |
|---|---|---|
| Finess Red 2B | 15 | Parts |
| Varnish C | 72 | " |
| Wax compound | 6 | " |
| Ethylene glycol | 7 | " |
| | 100 | Parts |

The ink C so prepared was printed on kraft paper using a Heidelberg KORD offset press fitted with a nylon printing plate in accordance with the dry offset system. During the period of printing the ink was tested for transferability from one roll to another (roll transfer), and at the end of printing the ink printed on the paper was tested for friction resistance and setting time. Such tests as were made in this and the following Examples are detailed hereinunder.

Test for setting time:
  Setting time is defined herein to be a time during which an ink printed on paper dries to the extent that it was felt not to be tacky when touched with the tip of a human finger.
Test for friction resistance:
  Test was made by repeating rubbing 20 times under a load of 4 pounds against an ink printed, using a Southerland rub tester fitted with high quality paper.
Test for wet friction resistance:
  Test was made by repeating rubbing five times under a load of 4 pounds against an ink printed, using a Southerland rub tester fitted with a piece of calico wetted with water.
Roll transfer:
  Transferability of an ink from the ink well of a Heidelberg offset KORD press through one kneading roll to another.

The ink C was tested as described above in comparison with the ink A as the control. The results are indicated in the following table.

Table

| Kind of ink | Setting time | Transferability between rolls | Wet friction resistance | Friction resistance |
| --- | --- | --- | --- | --- |
| Ink A | 20 sec. | Satisfactory | Satisfactory | Satisfactory |
| Ink C | 20 sec. | Satisfactory | Satisfactory | Satisfactory |

From the above table, it is clear that the ink C is not inferior to the ink A wherein the fumaric compound-modified rosin is used, and may therefore be used as a glycol-soluble ink.

EXAMPLE 2

Twenty-eight parts of the resin (acid number, 220; softening point, 145°C) obtained in Reference example 2 were mixed with, and dissolved in, a mixture comprising 25 parts of isopropyl alcohol, 15 parts of methanol, 10 parts of ethanol, 16 parts of water and 6 parts of a 28 percent ammonia water, to form a varnish D. The varnish D was used together with the other ingredients as indicated in the following table, thereby to obtain a gravure ink.

| Ink D | |
| --- | --- |
| Ingredient | Amount |
| Finess Red 2B | 16 Parts |
| Defoaming agent (supplied under the trademark of "Shin-etsu Silicone KF-96" produced by Shin-etsu Chemical Co., Ltd.) | 1 Part |
| Varnish D | 73 Parts |
| Water | 10 Parts |
| | 100 Parts |

The aqueous gravure ink D so prepared and the ink B obtained in Reference example 2, were printed using a hot air drier-provided gravure printing press at 200 r.p.m. to evaluate their performance. The results are shown in the following table from which it is seen that both the ink B wherein the maleic compound-modified rosin is used and the ink D wherein the maleic-modified resin is used, exhibit approximately equal performances, and that the maleic-modified resin and the like may therefore be substituted for the maleic-modified rosin without incurring any disadvantage.

Table

| Kind of ink | Pin hole | Graduation of color tone | Stain of reversing roll | Blocking caused in rolling |
| --- | --- | --- | --- | --- |
| Ink B | None | Satisfactory | None | None |
| Ink D | None | Satisfactory | None | None |

Remarks:
(1) "Pin holes" mean those created in printed matter due to ink bubbles and repellency.
(2) Graduation of color tone indicates a contrast between deep-colored areas and light-colored areas in printed matter.
(3) Stain of reversing roll may appear when the ink used is one which dries at a low rate (inferior drying property).
(4) Blocking caused in rolling may be caused when the ink used is one which dries at a low rate.

EXAMPLE 3

Thirty parts of the resin (acid number, 220; softening point, 145°C), 10 parts of ethanol, 8 parts of a 28 percent ammonia water and 52 parts of water were treated in the same manner as in Example 2 to obtain a varnish E. A flexographic ink was prepared from the following ingredients including the varnish E and was then subjected to tests the results of which are shown in the following table.

| Ink E | |
| --- | --- |
| Ingredient | Amount |
| Finess Red 2B | 10 Parts |
| Varnish E | 75 Parts |
| Defoaming agent | 3 Parts |
| Microcrystalline wax | 2 Parts |
| Water | 10 parts |
| | 100 Parts |

The ink E thus prepared was applied to glass plates and linerboard by the use of an Anilox rubber (hardness, 50) roller with 75 lines. The ink so applied was then tested for drying property (in terms of setting time) and friction resistance. In this case, the ink A of Comparative example 1 printed on linerboard was used as the control.

Table

| Kind of ink | Drying property | | Friction resistance (Linerboard) | |
| --- | --- | --- | --- | --- |
| | Glass plate | Linerboard | Friction resistance | Wet friction resistance |
| Ink E | 5 min. | 5 sec. | Satisfactory | Satisfactory |
| Ink A | | | Satisfactory | Satisfactory |

From this table it can also be seen that the resins according to this invention are usable in aqueous flexographic inks.

What is claimed is:

1. A process for the preparation of a resin having an acid number of at least 180 and softening point of 100°–200°C, characterized by reacting a member selected from the group consisting of dicyclopentadiene and methyldicyclopentadiene, with an unsaturated dibasic acid anhydride in molar ratios of from 70/30 to 40/60 at 170°–330°C for 20 minutes to 10 hours.

2. A resin for use as a resinous varnish in an alcohol-soluble or water-soluble ink composition, the resin comprising (a) dicyclopentadiene or methyl dicyclopentadiene units and (b) maleic anhydride units in respective molar ratios (a/b) of from 70/30 to 40/60 and having an acid number of at least 180 and a softening point of 100°–200°C.

* * * * *